United States Patent [19]

Lederman

[11] Patent Number: 4,921,084
[45] Date of Patent: May 1, 1990

[54] LOW FRICTION ROLLER CONTROL CAR

[75] Inventor: Frederick E. Lederman, Sandusky, Ohio

[73] Assignee: General Motors Corporation, Detroit, Mich.

[21] Appl. No.: 342,157

[22] Filed: Apr. 24, 1989

[51] Int. Cl.$^5$ .................................... F16D 41/06
[52] U.S. Cl. ........................... 192/45; 192/113 R
[58] Field of Search ............... 192/45, 113 R, 113 B

[56] References Cited

U.S. PATENT DOCUMENTS

| 2,044,197 | 6/1936 | Barthel | 192/45 |
| 3,917,036 | 11/1975 | Johnson et al. | 192/45 |
| 3,942,616 | 3/1976 | Elmore | 192/45 |
| 4,054,192 | 10/1977 | Johnson | 192/45 |
| 4,185,724 | 1/1980 | Kitchin | 192/45 |
| 4,522,289 | 6/1985 | Giese et al. | 192/41 A |
| 4,549,638 | 10/1985 | Johnston | 192/45 |
| 4,712,661 | 12/1987 | Lederman et al. | 192/45 |
| 4,724,940 | 2/1988 | Lederman | 192/45 |
| 4,821,856 | 4/1989 | Lederman | 192/45 |

FOREIGN PATENT DOCUMENTS 1296976 11/1972 United Kingdom ............... 384/576

Primary Examiner—Rodney H. Bonck
Attorney, Agent, or Firm—Patrick M. Griffin

[57] ABSTRACT

A roller clutch uses metal roller control cars that closely contain the rollers while making minimal direct contact therewith, and which are in turn guided by the cage side rails during clutch operation so as to keep the rollers square to the cage. Roller skew is thereby reduced with minimal friction between the roller cars and the rollers as they spin.

2 Claims, 2 Drawing Sheets

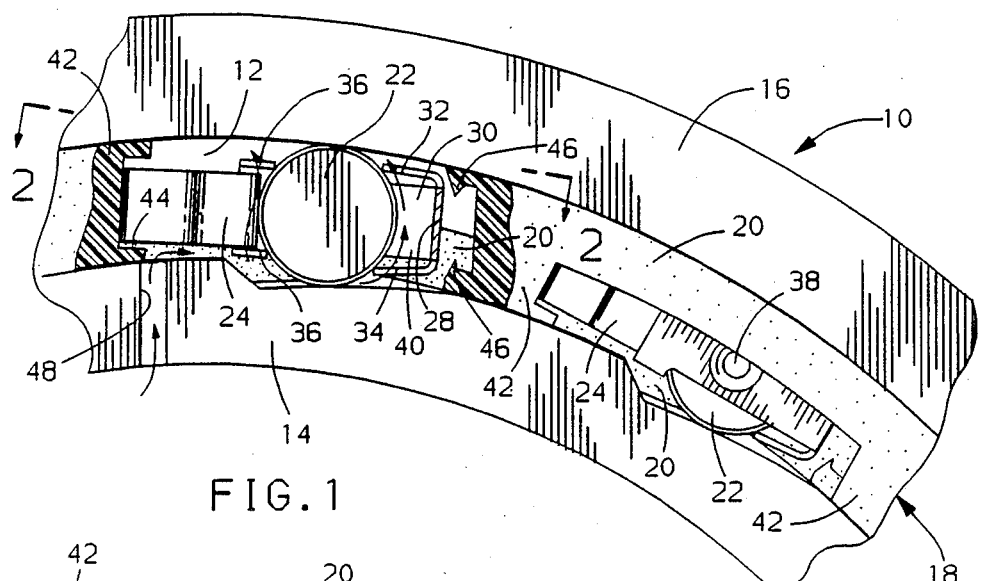
FIG. 1
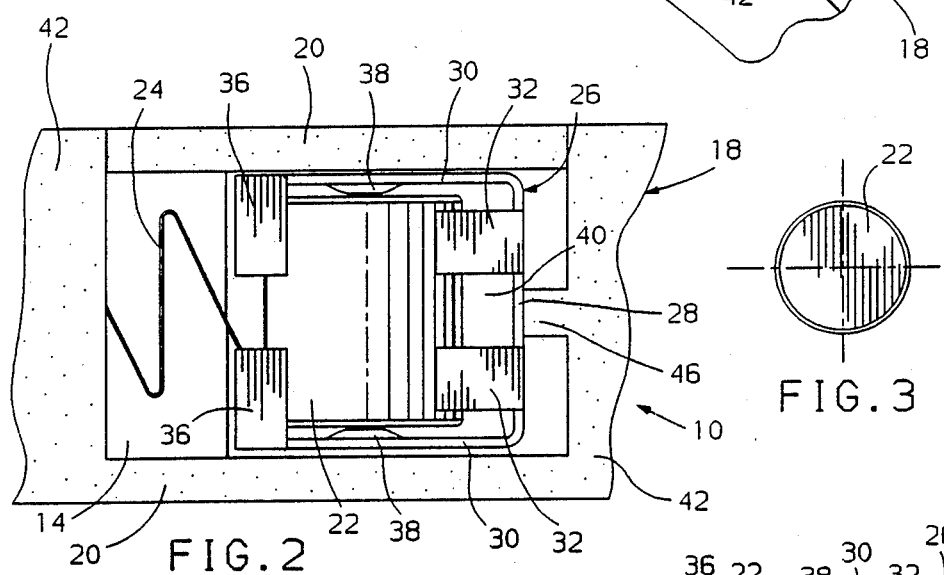
FIG. 2
FIG. 3
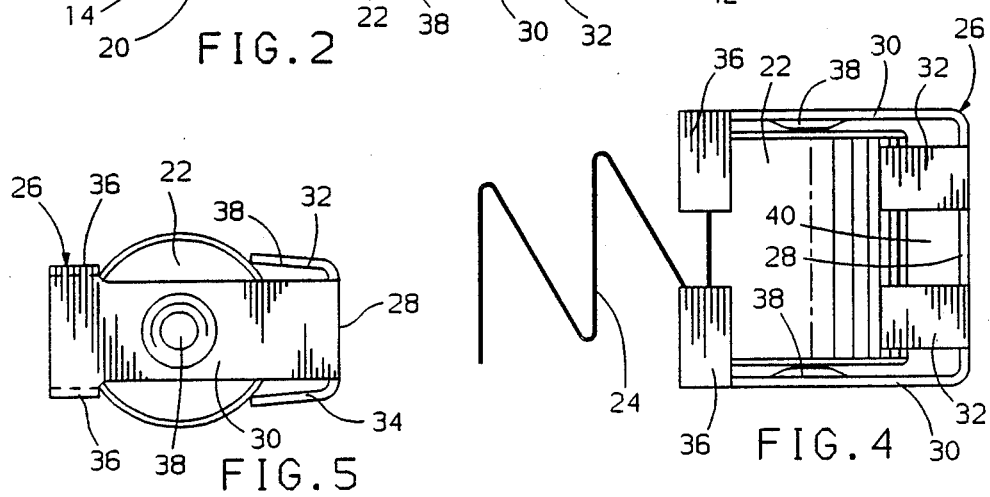
FIG. 5
FIG. 4

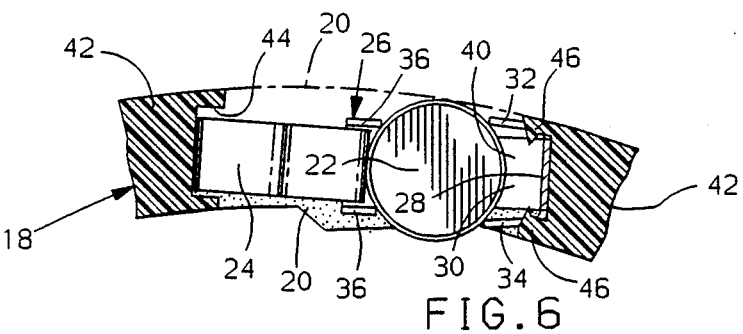
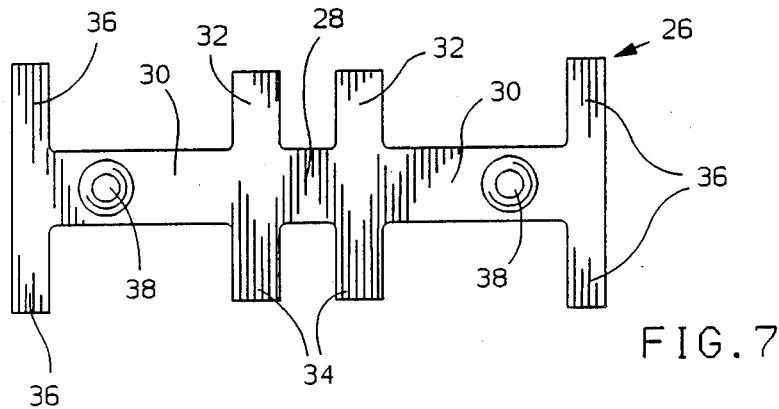
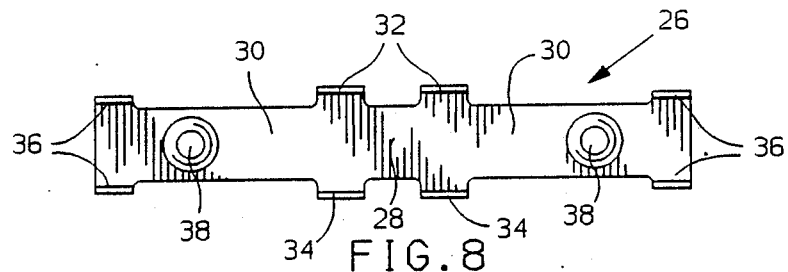
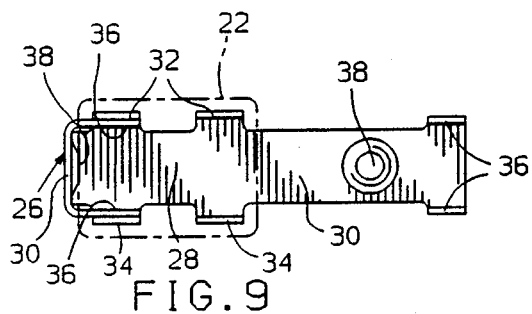
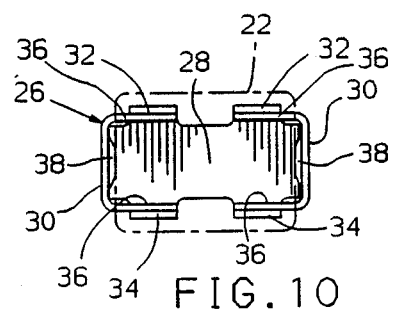

LOW FRICTION ROLLER CONTROL CAR

This invention relates to overrunning clutches in general, and specifically to a roller clutch with roller control cars specially designed to minimize frictional contact with the rollers.

BACKGROUND OF THE INVENTION

The rollers in conventional overrunning roller clutches, especially those used at high speeds, are subject to pathway traction that can cause them to spin during clutch overrun. Furthermore, the rollers are guided basically just by the bumping contact that the roller ends make with the inside of the cage side rails. As such, the rollers are particularly subject to skew and misalignment at high speeds, and can wear on the side rails. Another problem with conventional roller clutches has been providing a secure retention for the rollers during shipping and handling. Typically, the roller energizing spring has been used to load the rollers against a roller retention groove in the cage. This presents the dilemma of either using an energizing spring that is just strong enough to provide roller energization, which gives a weak roller retention, or using a stronger roller energizing spring, which worsens the traction and roller spin problem.

Recent advances in roller clutch design by the assignee of the subject invention have provided a practical solution to all of the above problems in the form of a plurality of roller control cars, one for each roller. Each roller is pop fitted tightly and closely into a respective car, so that the cars stay with the rollers as the rollers travel. The roller cars, in turn, are guided by the clutch cage as they move, more rigorously than the roller ends alone would be guided by the cage side rails in a conventional clutch. The net effect is to keep the rollers square to the cage, very effectively preventing roller skew. Shipping retention can also be provided by releasably retaining the roller holding cars to the cage during shipping, the net effect of which is to retain the rollers to the cage, totally independently of the resilience of the energizing springs. In addition, the rollers are wrapped so tightly by the cars that a great deal of mutual friction is generated if the rollers tend to spin, retarding the speed of roller spin that would otherwise be generated, and producing frictional heat. In short, a great deal of advantage is gained with very little additional clutch structure. In the future, new roller cars will likely be invented tailored to specific and different and clutch environments and situations, or which provide new advantages in terms of of lower cost and easier assembly.

SUMMARY OF THE INVENTION

The subject invention provides such a new roller car design tailored to a high temperature environment. Rather than attempting to maximize car-roller contact to retard roller spin by purposely generating frictional heat, the invention does the opposite, seeking to minimize car-roller contact and thereby minimize the heat of friction.

In the preferred embodiment disclosed, each roller car is folded from a sheet steel blank into a general U shape, with a base wall and a pair of side walls. The inside surfaces of the car side walls border the ends of a respective roller, while the outside surfaces of the car side walls are bordered and guided by the cage side rails. Axially and radially spaced pairs of retention tabs bent from the car base and side walls engage the back and front of the roller only along edge lines located above and below the central plane of the roller. Therefore, the roller is kept square to, and retained in, the car, but with a minimum of direct contact. Consequently, while roller spin is not directly retarded, roller skew is well controlled, with minimal friction. The pairs of retention tabs are also sufficiently axially spaced from one another, and keep the roller spaced far enough away from the walls of the car, that there is unobstructed space essentially all around the roller. Therefore, lubricating oil that is forced radially outwardly through the annular space between the clutch races as the clutch operates can efficiently flow around and cool the roller. The front of the energizing spring is also retained radially between the front roller retention tabs, and so may directly contact the roller, thereby compensating for the circumferential space necessary to keep the roller spaced away from the car walls.

It is, therefore, an object of the invention to provide an overrunning clutch with roller control cars for a high temperature environment in which the roller cars are specifically designed to minimize the direct contact between the rollers and cars, thereby minimizing the heat generated by friction from the spinning rollers.

It is another object of the invention to provide such a roller car that is designed to efficiently dissipate any heat of friction that is generated.

It is yet another object of the invention to provide such a clutch in which the roller cars engage the roller with roller retention tabs which make only minimal, edge line contact with the roller, while at the same time spacing the roller away from the the walls of the roller car to create oil flow passages around the car so that oil can flow efficiently around the roller to cool it.

It is still another object of the invention to provide such a roller car in which the front leaf of the energizing spring is retained between a pair of front roller car retention tabs, thereby directly contacting the roller and minimizing the circumferential space occupied by the roller car and spring.

DESCRIPTION OF THE PREFERRED EMBODIMENT

These and other objects and features of the invention will appear from the following written description, and from the drawings, in which:

FIG. 1 is a view looking along the clutch axis of a portion of the clutch races and installed cage with a portion of one cage side rail and roller car broken away to show one roller and spring, and to show the direction of oil flow;

FIG. 2 is a view looking radially into a roller car, roller, and spring unit in the cage from the perspective line 2—2 of FIG. 1;

FIG. 3 is an end view of a roller showing the central plane of the roller and a radial plane of the clutch by dotted lines;

FIG. 4 is a view showing a roller car, roller spring unit removed from the cage;

FIG. 5 is a side view of a roller car alone;

FIG. 6 is a view like FIG. 1, but showing the roller clutch before installation with the roller and roller car in its shipping retention position;

FIG. 7 is a view of the metal blank from which the roller car is folded;

FIG. 8 is a view of the car blank after the various retention tabs have been folded down from the blank;

FIG. 9 shows the car blank after one side wall has been folded in;

FIG. 10 shows the completed roller car, from the front end.

Referring first to FIGS. 1, 2 and 4, a preferred embodiment of the overrunning roller clutch of the invention, designated generally at 10, is installed in the annular space 12 between an inner cam race 14 and a coaxial outer pathway race 16. The basic framework of clutch 10 is a plastic molded cage, indicated generally at 18, which has a pair of axially opposed side rails 20. Cage 18 is installed non-turnably onto cam race 14 before the pathway race 16 is installed with a simultaneous pushing and counterclockwise twisting motion, commonly referred to as "ringing in". Since it is fixed within the annular space 12, cage 18 provides the foundation to which other clutch components are mounted and secured, and from which they directly or indirectly obtain their positioning and alignment during operation. The other components of clutch 10 include a plurality of cylindrical steel rollers 22, a matching plurality of energizing springs, indicated generally at 24, and a matching plurality of roller cars, one of which is indicated generally at 26. The clutch environment for which clutch 10 is intended is one in which roller spin, although present, is not high enough to create the potentially harmful wear on cam race 14 referred to in the background section above. Thus, the cars 26 are not intended to directly retard roller spin. The environment between the clutch races 14 and 16 is very hot, however, and one in which potential misalignment between the races 14 and 16 and other disturbing forces can cause a significant axial skew of the rollers 22. Skew causes the rollers 22 to shift forcefully to the side and wear on the cage side rails 20, in the absence of some controls or protection. The invention is specifically tailored to dealing with the potential heat, skew, and cage wear problems, as will appear below.

Referring next to FIGS. 2, 3 and 4, details of the relation of each car 26 to its respective roller 22 and spring 24 can best be understood after defining some portions of the surface of the roller 22. As shown in FIG. 3, each roller 22 has what may be termed a central plane, shown by the horizontal dotted line, which bisects the roller 22 lengthwise. The central plane is also normal to a radial plane of clutch 10, that is, a plane that contains both the central axis of clutch 10 and the axis of roller 22, and which is shown by a vertical dotted line. Roller 22 may be thought of as having a "back" comprising the 180 degree portion of its surface to the right of the radial plane, and a "front" comprising the left 180 degrees. Although the surface of roller 22 is obviously not static during operation, the various elements of car 26 may be conveniently defined as contacting the front or back of roller 22, and as being above or below the central plane of roller 22. Spring 24 is the accordion type, with flat leaves and radially extending folds or pleats. As seen in FIG. 4, each roller 22, spring 24 and car 26 together constitute a unit, and the three elements of that unit cooperate with one another and with cage 18, as will be described in more detail below.

Referring next to FIGS. 4 and 7-10, the structural details and the various steps involved in the manufacture of one roller car 26 are illustrated. Each roller car 26 has a general U-shape, best seen in FIG. 4, with a base wall 28 and a pair of parallel side walls 30 which are spaced apart slightly more than the length of a roller 22. Car 26 is folded from a sheet steel blank, shown in FIG. 7 in its prefolded state. The blank is cut out with an upper pair of axially spaced rear retention tabs 32 and an identical lower pair of axially spaced rear retention tabs 34, all integral with base wall 28. The blank also has a pair of opposed front retention tabs 36 at the end of each side wall 30. After the blank has been cut, a dimple 38 is stamped into each side wall 30, which has already been done as illustrated in FIG. 7. Then, all of the pairs of rear and front retention tabs 32, 34 and 36 are bent down and out approximately ninety degrees, as seen in FIG. 8. Next, one side wall 30 is bent in ninety degrees, as shown in FIG. 9. Finally, a roller 22 is placed between the front retention tabs 36 of the folded side wall 30 and the rear retention tabs 32 and 34. Then, the remaining side wall 30 is folded in, completing the car 26, as shown in FIG. 10. The roller 22 is shown in dotted lines only for purposes of clarity.

Referring next to FIGS. 4 through 6, after car 26 has been completed, it forms a subassembly with its respective roller 22. The two pairs of rear retention tabs 32 and 34 engage the back or roller 22 both above and below the central plane, and the pairs of front retention tabs 36 engage the front of roller 22 both above and below the roller central plane. Therefore, roller 22 is completely and closely confined to, and retained within, car 26. However, the rear and front retention tabs 32, 34 and 36 contact the outer surface of roller 22 only along edge lines that are no thicker than the thickness of the metal stock from which car 26 is folded. Furthermore, the centers of the ends of roller 22 contact the car side walls 30 only at the dimples 38. Consequently, there is minimal direct contact between each roller 22 and its respective car 26. In addition to the minimal direct contact, the upper and lower pairs of rear retention tabs 32 and 34 are long enough, and sufficiently axially spaced, to create a totally unobstructed circumferential space 40 between the back of roller 22 and the roller car base wall 28. Also, the dimples 38 keep the ends of roller 22 spaced away from the roller car side walls 30, and the front retention tabs 36 do not extend axially toward one another far enough to touch. Therefore, there is a radially unobstructed space almost completely surrounding roller 22. Another feature of roller car 26 is that it needs no front wall, since the front retention tabs are folded down off of the side walls 30. These features of car 26 give skew control to roller 22, provide efficient cooling, and also provide a secure shipping retention, as will be described next.

Referring next to FIG. 6, the assembly of clutch 10 is illustrated. The cage side rails 20 are joined by a plurality of evenly circumferentially spaced cross bars 42 that are slightly longer than the axial width of a roller car 26. A spring mounting groove 44 is molded into one side of each cross bar 42, and a radially opposed pair of latching jaws 46 is molded to the other side. The latching jaws 46 are spaced apart by slightly more than the radial width of a roller car base wall 28. Each roller 22-roller car 26 subassembly may be dropped into the pocket formed by the side rails 20 and each pair of opposed cross bars 42, and the car side walls 30 will be closely bordered by the cage side rails 20. Each car 26 may be retained to cage 18 by snapping the base wall 28 in between a pair of latching jaws 46, as there is ample room in the space 40 for the jaws 46. Then, the spring 24 for each car 26 is inserted between the front retention tabs 36 and the opposed spring mounting groove 44.

This gives complete, secure shipping retention for each roller 22, spring 24, and car 26 to cage 18, totally independent of the resilience of spring 24. The extra circumferential room taken up between the cross bars 42 by the space 40 is compensated to an extent by the fact that roller car 26 has no front wall, allowing spring 24 to directly contact the front of roller 22. And, the fact that the front leaf of spring 24 is radially confined between the roller car front retention tabs 36 means that it need not be stamped with the standard curvature that would conventionally allow it to conform to the roller 22 during shipping.

Referring next to FIGS. 1 and 2, the post installation operation of clutch 10 is illustrated. Cage 18 is installed by the conventional, ringing in method described above, which pushes each roller 22 and its roller car 26 to the left. This snaps the roller car base walls 28 out from between the latching jaws 46. Thereafter, as shown in FIG. 1, each roller 22 is totally free to travel circumferentially back and forth with its car 26 as the spring 24 expands and contracts during normal clutch operation. However, the tendency of the roller 22 to axially skew will be strongly resisted by the fact that the roller 22 is kept rigorously square to the car 26 combined with the fact that the car side walls 30 are closely guided by the cage side rails 20. The net effect is that the roller 22 is kept rigorously square to the axis of the cage 18 and clutch 10. This skew control and reduction greatly reduces the tendency of the ends of the rollers 22 to dig into the cage side rails 20, which are also armored against the ends of the rollers 22 by the car side walls 30. Reducing skew also helps to reduce the spin of roller 22, although there is no provision to directly retard spin, since there is minimal contact between roller 22 and car 26. However, that minimal direct contact does mean that there is minimal potential for the generation of frictional heat in the high heat environment as roller 22 spins. The dimples 38 engage the rollers 22 near the axis, where spin speed is also lowest. Also, since the front leaf of spring 24 can be flat, as noted above, it makes less direct contact with roller 22. Furthermore, being metal, any heat of friction that is generated may be efficiently dissipated by car 26, and spring 24, to its surroundings.

Referring again to FIG. 1, further helping to dissipate heat, in the particular environment disclosed, is the fact that cooling oil is continually supplied to the annular space 12. Specifically, oil is supplied under pressure from supply grooves 48 in the face of cam race 14, from which it is flung radially outwardly as the clutch 10 spins during overrun. The radially unobstructed space around roller 22 gives a convenient oil flow passage or space. Oil can thus flow freely out and around roller 22 to cool it. The spring 24, since it is radially pleated, does not obstruct that flow. Thus, all the features of the car 26 contribute and cooperate in reducing roller skew, reducing the heat of friction, and efficiently dissipating what heat is created.

Variations of the embodiment disclosed may be made. Car 26 could be made in a four wall, box shape, rather than the three wall, no front wall U shape shown. In that case, the front retention tabs could be bent in from the front wall. The U shaped design, however, by eliminating the front wall, makes for a simpler, more compact design, and provides a convenient, low friction retention for the front of spring 24. The space 40 need not be made as large as is shown, although it does both provide room for the latching jaws 46 and for oil flow, and does occupy only space that a car front wall otherwise would occupy. Therefore, it will be understood that the invention is not intended to be limited to just the embodiment disclosed.

The embodiments of the invention in which an exclusive property or privilege is claimed are defined as follows:

1. An overrunning clutch of the type in which a plurality of cylindrical rollers is located in the annular space between a pair of substantially coaxial clutch races, and in which said rollers are subject to spin and skew during clutch operation, said clutch comprising,
   a cage adapted to be installed in said annular space including a pair of axially opposed side rails,
   a plurality of roller cars, one for each roller, each of said cars being formed from sheet metal with a base wall and a pair of parallel side walls extending therefrom and sized to fit closely between said cage side rails so as to maintain said roller car square to said cage,
   said base wall also having a pair of rear retention tabs extending circumferentially therefrom and engaging the back of said roller only along a pair of edge lines above and below a central plane of said roller,
   said roller car side walls each also having a pair of front retention tabs extending axially inwardly therefrom and engaging the front of said roller only along a pair of edge lines above and below said roller central plane, thereby maintaining said roller square to said roller car in cooperation with said rear retention tabs with minimal direct contact between each roller car and roller,
   whereby, roller skew is controlled by said roller car while heat generated by friction between said spinning roller and said roller car is kept to a minimum and is also efficiently dissipated by said metal roller car.

2. An overrunning clutch of the type in which a plurality of cylindrical rollers is located in the annular space between a pair of substantially coaxial clutch races, and in which said rollers are subject to spin and skew during clutch operation, and in which a flow of lubricating oil is forced radially through said annular space during clutch operation, said clutch comprising,
   a cage adapted to be installed in said annular space including a pair of axially opposed side rails,
   a plurality of roller cars, one for each roller, each of said cars being formed from sheet metal in a general U shape including a base wall and a pair of parallel side walls extending therefrom and sized to fit closely between said cage side rails so as to maintain said roller car square to said cage,
   said base wall also having two pairs of axially spaced rear retention tabs extending circumferentially therefrom and engaging the back of said roller only along a pair of edge lines above and below a central plane of said roller, said pairs of rear retention tabs further being sufficiently long and sufficiently axially spaced to create an unobstructed circumferential space between said roller car base wall and the back of said roller,
   said roller car side walls each also having a pair of front retention tabs extending axially inwardly therefrom and engaging the front of said roller only along a pair of edge lines above and below said roller central plane, thereby maintaining said roller square to said roller car in cooperation with said rear retention tabs with minimal direct contact between each roller car and roller, a matching plurality of metal roller energizing springs, one for each roller, each spring being mounted to said cage with a front leaf that fits between said roller car front retention tabs so as to directly contact the front of said roller, thereby minimizing the circumferential space occupied by said spring, roller car and roller as a unit, whereby, roller skew is controlled by said roller car while heat generated by friction between said spinning roller and said roller car is kept to a minimum and is also efficiently dissipated by said metal roller car and spring and by said lubricating oil flowing through said circumferential space and around said roller.

* * * * *